July 4, 1967 M. C. GROWALD 3,329,750
METHOD FOR CONSTRUCTING A SHELL-FORM STRUCTURE
Original Filed July 18, 1960 2 Sheets-Sheet 1
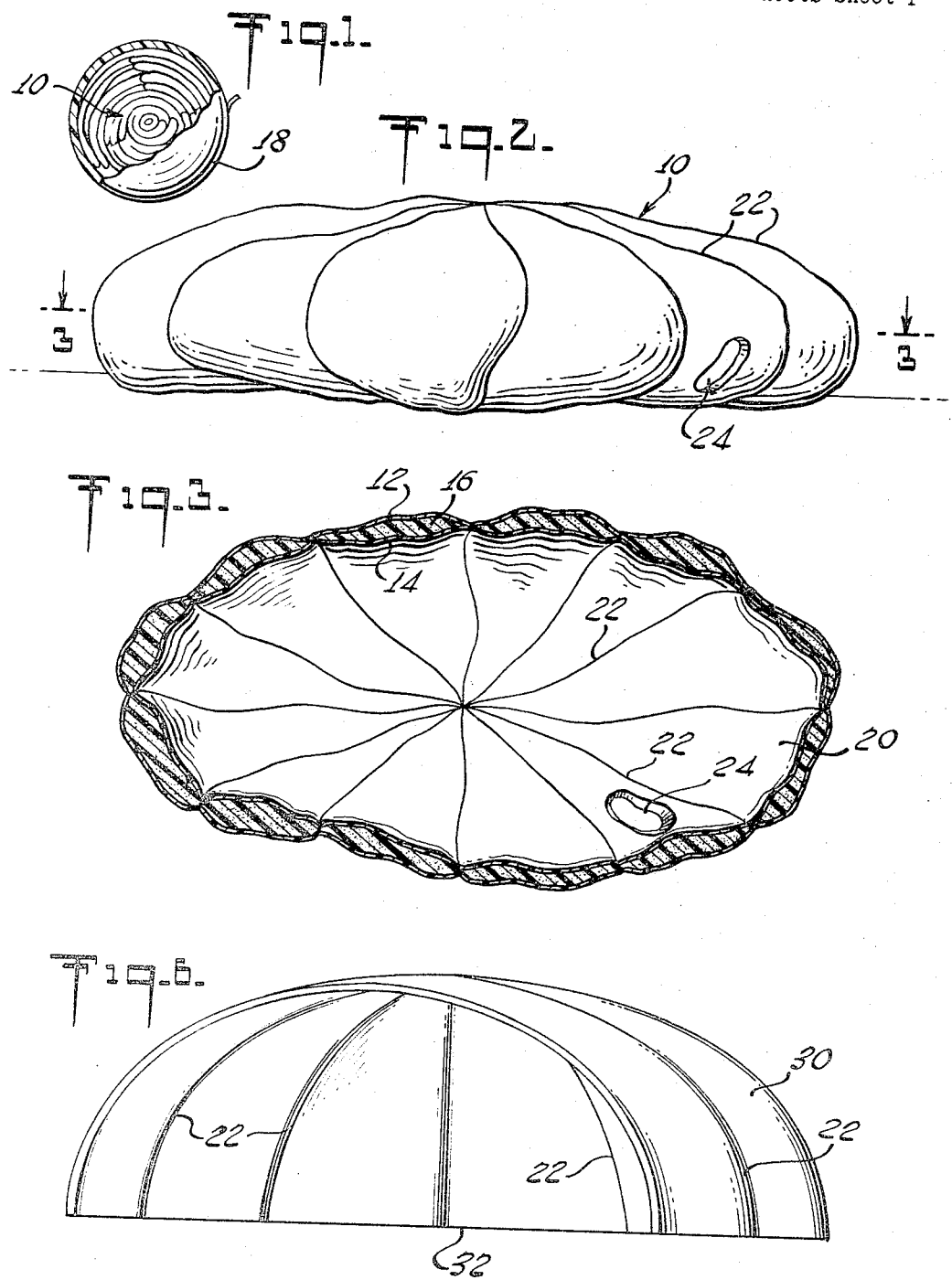
INVENTOR
MARTIN C. GROWALD
BY
Moses, Nolte, & Nolte
ATTORNEYS July 4, 1967 M. C. GROWALD 3,329,750
METHOD FOR CONSTRUCTING A SHELL-FORM STRUCTURE
Original Filed July 18, 1960 2 Sheets-Sheet 2
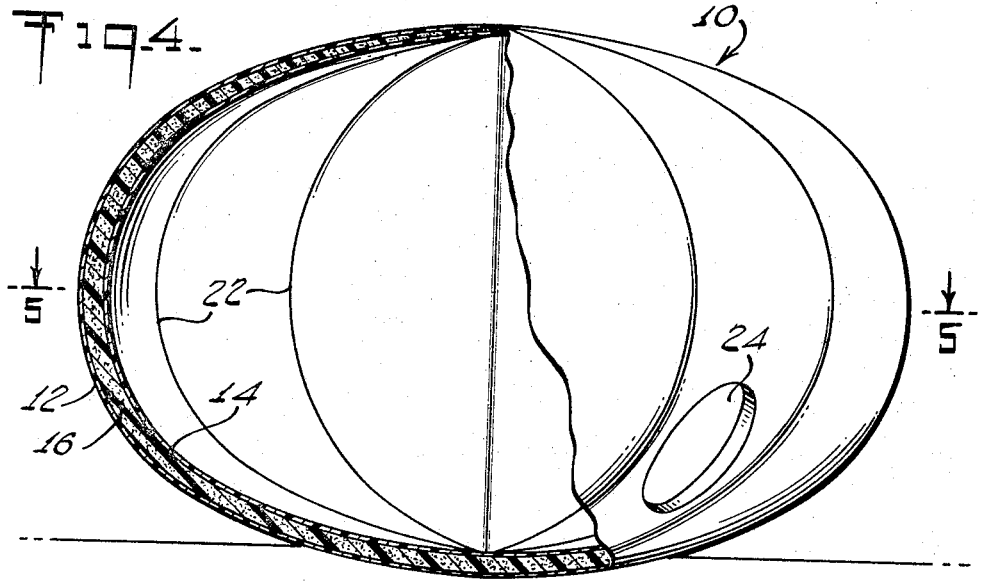
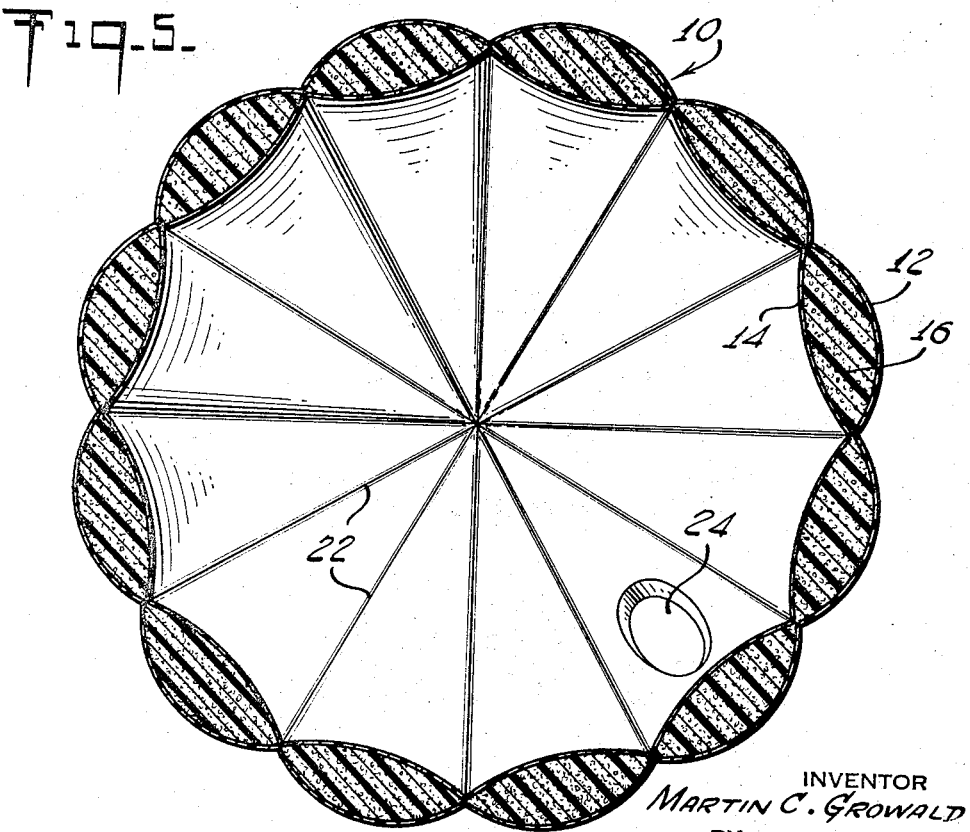
INVENTOR
MARTIN C. GROWALD
BY
Moses, Nolte, & Nolte
ATTORNEYS United States Patent Office 3,329,750
Patented July 4, 1967

3,329,750
METHOD FOR CONSTRUCTING A SHELL-FORM STRUCTURE
Martin C. Growald, New York, N.Y., assignor of seventy-five percent to Albert C. Nolte, Jr.
Continuation of application Ser. No. 43,645, July 18, 1960. This application Aug. 2, 1965, Ser. No. 480,238
5 Claims. (Cl. 264—45)

This is a continuation of application Ser. No. 43,645, filed July 18, 1960 for an architectural structure by the present inventor.

The present invention relates to methods of fabricating self-erecting architectural or other structures.

The invention provides a technique for constructing rigid or semi-rigid structures such as buildings, water borne structures, automobiles, aircraft, or other structures, enclosures or partial enclosures by the use of plastic materials capable of expanding and hardening to form a shaped rigid structure. The invention particularly contemplates the use of foaming plastics adapted for filling the spaces betwen a pair of flexible sheets so that when the plastic foam hardens, it provides together with the flexible sheets a fairly rigid envelope, in the form of a sandwich comprising flexible sheets having a plastic foam therebetween.

According to one feature of the invention, a flexible double-walled envelope is formed having at least its inner wall of air tight material. This is placed on site and the inner wall is inflated or otherwise extended to the desired shape of the final structure, with the outer wall of the envelope resting loosely on the inflated inner wall. The foaming plastic ingredients are then introduced between the two walls of the envelope at appropriate points. As the material foams and expands it fills the space between the two walls of the envelope, thereby filling out the outer wall of the envelope and taking the desired shape.

According to another feature of the invention, a flexible double envelope of the type described above is formed with channels of various appropriate configurations incorporated into the space between the two walls. Some of these chanels are inflated and serve to unfold the double envelope to the desired configuration of the final structure. The uninflated spaces left between the inflated channels are filled with the foaming plastic by introducing the plastic foam ingredients at suitable points. When the plastic foam has hardened it serves to support the structure so that the originally inflated channels may be deflated. These latter channels then, in turn, may be filled with foaming plastic.

According to still another feature of the invention, the plastic envelope containing the plastic foam ingredients may be chilled and enclosed in an air tight container or crate, preferably made of plastic. When the structure is to be erected the envelope is removed from the crate and inflated as described above. The plastic foam ingredients are then allowed to reach the temperature at which they will react to produce the foam and harden.

An object of the invention is to provide improved methods of erecting homes, building, or other structures with a minimum amount of work at the site.

Another object of the invention is to provide extremely simple and efficient techniques for erecting structures which may have a great variety and freedom of stapes.

Other objects and advantages of the invention will be fully understood from the following description and the drawings in which:

FIG. 1 shows a collapsed crated structure with the crate partly broken away;

FIG. 2 is a perspective view of a structure partially erected;

FIG. 3 is a sectional view of FIG. 2 taken along the line 3—3;

FIG. 4 is a view of the structure of FIG. 2 completely erected, shown partly broken away;

FIG. 5 is a sectional view taken along the line 5—5 of FIG. 4; and

FIG. 6 is a perspective view of another structure according to the invention.

Plastic materials are known and available which form rigid foams by the reaction of the ingredients to evolve gases which form bubbles throughout the soft liquid or semi-liquid mass and cause it to expand. Further reaction of the ingredients causes the foamy mass to harden into a rigid foam. There are a number of plastics which undergo this foaming action and among them are the group known as polyurethanes. The foaming action may take place quickly and be completed in a matter of minutes, depending upon the composition employed and the temperature. Sufficient hardening to form a rigid mass also may take place in a few minutes, but complete hardening and full development of the strength of the plastic foam may require hours or even longer periods at ordinary room temperatures. At elevated temperatures, both foaming and hardening are accelerated, and conversely the reactions are decelerated and may be arrested at lower temperatures, or by refrigeration.

According to the invention, an envelope or form 10 is shaped so as to eventually provide a desired contour. The envelope comprises two walls of flexible material such as the sheets 12 and 14. These sheets may be formed of plastic material such as "Mylar" or nylon, or fabrics such as cotton, canvas, or muslin. The fabrics 12 and 14 may be coated so as to render them air tight, or at least one of the fabrics, the outer one say, may have some openings for the escape of the excess gases of the foam plastic. The spaces between the walls 12 and 14 of the envelope may be provided with the plastic foam ingredients 16. The entire envelope including the plastic foam ingredients may be collapsed and compactly enclosed in a suitable crate 18 while kept at a sufficiently low temperature to prevent reaction of the ingredients. The crate 18 and its contents are then maintained under refrigeration until the structure is brought to the site and is prepared to be erected. Package 18 is then opened and envelope 10 is removed and spread out. The envelope is, at the same time, exposed or subjected to higher temperatures and the foaming plastic ingredients 16 are activated. The ensuing pressure of the foaming plastic causes the enclosing chambers or channels 20 between the seams 22 to inflate to their maximum size thereby erecting the structure. The method of controlling the foaming plastic reaction varies with the type of ingredients used. The foaming of some compounds can be controlled by increasing the temperature. This may be done in any suitable manner, as, for example, the use of infrared lamps or other heat sources. Another way of controlling the foaming reaction is by capsulation of the ingredients so that a physical barrier is provided between the foaming resin, say, and its catalyst. When the reaction is desired, the barrier is removed by tearing, melting, or otherwise breaking it.

Suitable openings 24, properly sealed off, may be provided, or after the structure has been erected and taken suitable form such as shown, for example, in FIGS. 4 and 5, openings 24 may be cut out to serve as doors, windows, etc.

According to another aspect of the invention the envelope 10 may be brought to the site without being loaded with the plastic foam ingredients. At the site the envelope may be loaded with the ingredients 16 in any suitable manner, such as by externally mixing the ingredients and then pouring or pumping the same into the space between the walls 12 and 14 through spouts or openings in the walls which may be sealed after the ingredients have been loaded. The plastic foaming ingredients thus loaded into the envelope are then allowed to foam and harden, thereby expanding the envelope into the desired shape.

If desired, the inner wall 14 may be inflated by the application of air pressure thereto. The outer wall 12 will then lie loosely on inner wall 14. The envelope may be of a form having previously loaded ingredients, or the ingredients may be loaded into it after the inner wall has been inflated. The foaming of plastic 16 and its subsequent hardening expand the outer wall and rigidify the entire structure. In view of the fact that the plastic foam is strong in comparison and the envelope itself is formed of materials which are strong in tension, the resulting structure has good strength characteristics.

Instead of inflating the inner wall 14 or in addition to doing so, selected chambers 20 may be inflated. The remaining chambers are then loaded with the foaming plastic material 16 and the latter is allowed to foam and harden to provide support for the structure. Thereafter, the originally inflated chambers 20 may be deflated and then loaded with the plastic foam ingredients so that these latter chambers are filled with a hardened plastic foam.

The structure constructed in accordance with the invention may take various forms. One such form is shown in FIG. 6 wherein the structure 30 is in the form of a shell having a plastic floor 32. The shell may have the shape of a quarter of a sphere, for example. Such a structure may be distended by the foaming material or by inflating chambers or channels thereof similarly to chambers 20. Floor 32 helps the structure to assume its curved form by preventing it from spreading out. Alternatively, the envelope may be supported by suitable scaffolding or other temporary structures. The plastic structure constructed in accordance with the invention may be provided with rigidifying members, or supports may be used to aid erection of the structure. Also the plastic structure, after being formed as described above, may have other materials applied over it. For example, concrete may be applied, as by spraying; or layers of glass fiber-reinforced plastics such as unsaturated polyesters or epoxies may be applied by spraying or other techniques. The plastic structure may also be covered by plaster or any other suitable or desired materials.

It will be understood that many modifications and variations of the structures and methods herein disclosed will be apparent to those skilled in the art. It should be understood, therefore, that the particular embodiments herein illustrated and described are only exemplary and of simple form, and that many changes may be made without departing from the principles of the invention, the scope of which is defined in the following claims.

What I claim is:

1. The method of constructing a shell-form structure, comprising the steps of providing a collapsed double walled envelope in the shape of said structure the walls of said envelope being joined at parts to form a plurality of separate chambers capable when expanded of supporting the envelope into substantially the shape of said shell form structure, and to form other chambers capable when expanded of completing the shell-form structure, expanding a foaming material within the first mentioned chambers to expand said double walled envelope to the desired configuration of the final structure, and thereafter expanding a foaming material into the second-mentioned chambers to additionally support the envelope and complete the shell-form structure, and allowing the foaming material to set.

2. A method of constructing a shell-form structure according to claim 1, wherein said foaming material is in a cooled inactive state and is located in the chambers, and foaming thereof takes place by application of heat thereto.

3. A method of constructing a shell-form structure according to claim 1, wherein said foaming material is caused to expand by introducing the reactants of said foaming material to the chambers of said double-walled envelope.

4. A method of constructing a shell-form structure according to claim 1, wherein the reactants forming said foaming material are located in the chambers and are caused to expand by removing a physical barrier between the reactants enabling the foaming reaction therebetween.

5. The method of constructing a self-supporting structure, comprising the steps of forming a flexible double-walled collapsed container, the walls of said container being joined at parts to form a plurality of airtight chambers therebetween, introducing a fluid into a first plurality of said chambers in sufficient amount to inflate said first plurality of chambers to temporarily support said structure, expanding a plastic foaming material between the walls of various ones of a second plurality of said chambers, hardening said plastic foaming material in enough of said second plurality of chambers to form a frame capable of supporting the structure when the fluid is removed from said first plurality of chambers, removing said fluid from said first plurality of chambers, and thereafter expanding and hardening additional plastic foaming material in said first plurality of chambers to form the completed structure.

References Cited

UNITED STATES PATENTS

| | | | |
|---|---|---|---|
| 2,812,769 | 11/1957 | Schaefer et al. | 264—45 XR |
| 3,059,253 | 10/1962 | Sager | 264—54 XR |
| 3,091,053 | 5/1963 | Gorwald | 264—45 XR |
| 3,110,552 | 11/1963 | Voelker | 264—45 |

ALEXANDER H. BRODMERKEL, *Primary Examiner.*

P. E. ANDERSON, *Assistant Examiner.*